Feb. 22, 1938.   M. E. DAYTON   2,109,311
TRAILER WHEEL ASSEMBLY
Filed July 1, 1935
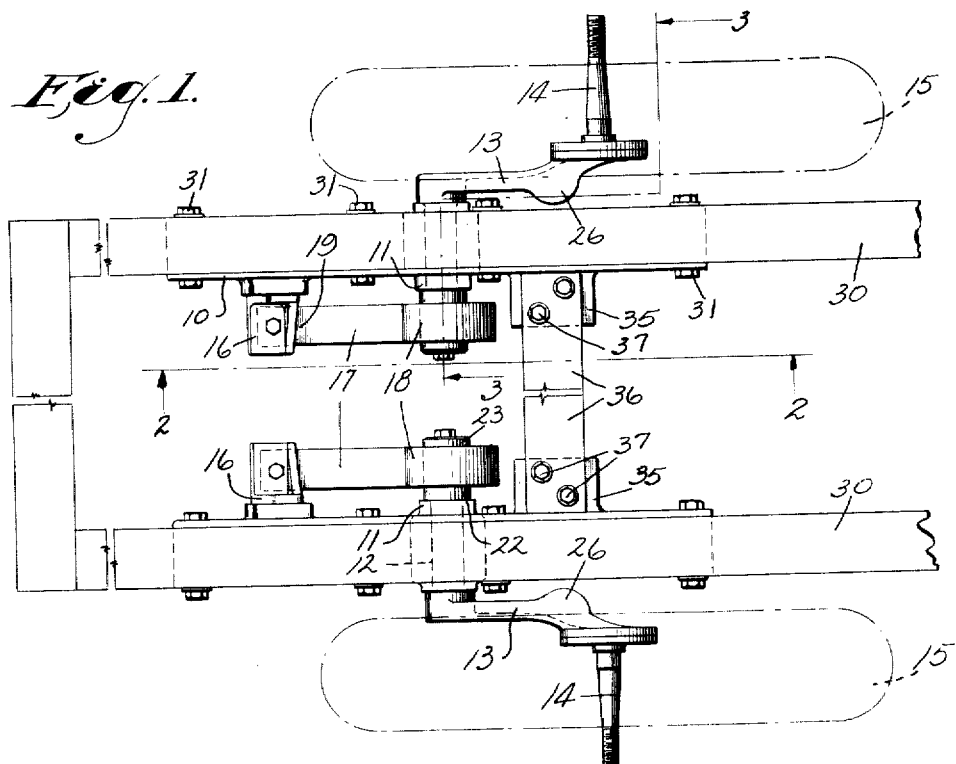
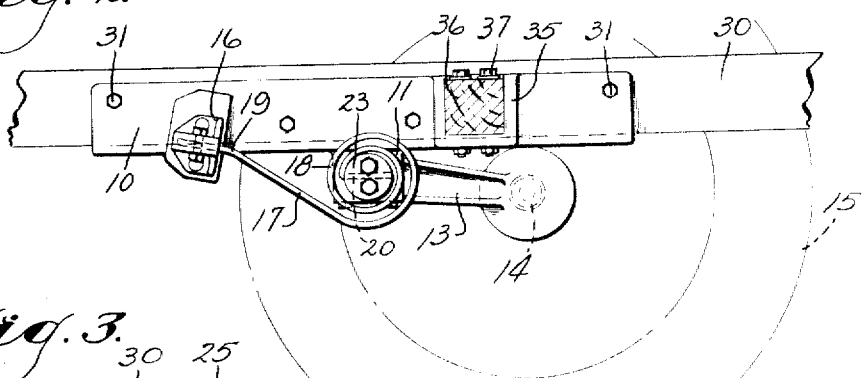
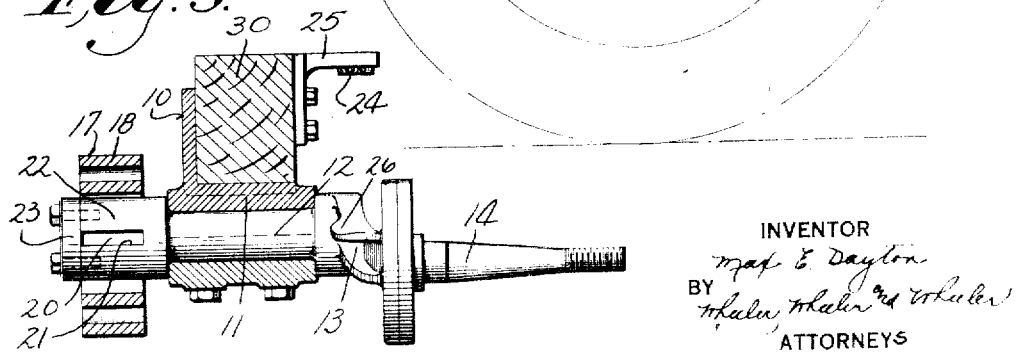
INVENTOR
Max E. Dayton
BY Whaler, Whaler and Whaler
ATTORNEYS Patented Feb. 22, 1938

2,109,311

UNITED STATES PATENT OFFICE 2,109,311

TRAILER WHEEL ASSEMBLY

Max E. Dayton, Rockford, Ill., assignor to Bamax Machine Co., Inc., Rockford, Ill., a corporation of Illinois Application July 1, 1935, Serial No. 29,252

1 Claim. (Cl. 280—106.5)

My invention relates to improvements in trailer wheel assemblies.

The object of my invention is to provide a unitary assembly comprising a spindle and wheel with a short frame unit with which the spindle may be unitarily associated in conjunction with a spring.

More particularly stated, it is the object of my invention to provide in a comparatively small assembly unit a short piece of iron frame, a journal, a spindle wheel and a particularly effective spring whereby the manufacturer of a trailer may incorporate my trailer wheel assembly into a home made trailer frame.

In the drawing:

Fig. 1 is a plan of a trailer frame in which my trailer wheel units have been installed.

Fig. 2 is a section on line 2—2 of Fig. 1.

Fig. 3 is a section on line 3—3 of Fig. 1.

Like parts are designated by the same reference characters throughout the several views.

Large numbers of trailers are now constructed in an infinite variety of shapes and sizes whereby to transport specific loads and such trailers are usually "custom built". Under such conditions, to conform the shape and size of the trailer to the usual rigid axle and conventional spring mountings and width of tread involves difficulties which it is the purpose of my invention to avoid and I have therefore provided in my invention for a unitary assembly of the necessary parts associated with a single wheel to the end that a manufacturer or builder of a special trailer, or of a standard trailer frame may, after completing the frame dispose my wheel elements at either side of the trailer at any convenient point to accomplish the desired supporting result, and because my wheel assembly includes the supporting spring structure and means whereby to control the various torsional stresses involved in the support of a trailer structure, my wheel unit is particularly adaptable to the problems of trailer construction.

As shown in the drawing, my unit includes a short frame 10 preferably of angle iron and provided with a bearing block 11. Through this bearing block is fitted the shaft 12 of a spindle arm 13, near the end of which is a spindle 14 to receive a wheel 15 shown in dotted lines. Spaced from the bearing block 11 upon the interior face of the angle iron frame 10 I provide a spring pad 16 to which is secured one end of a spring 17 which is shaped in the form of a spiral 18 about the shaft 12 of the spindle arm and is provided with an extended substantially straight portion 19 to be received in the spring pad 16.

The inner convolutions of the spiral portion 18 of the spring 17 terminate at 20 in a diametrically disposed straight portion receivable in a slot 21 in a hub 22 upon shaft 12, and a cap 23 upon the end of the hub 22 prevents the spring from being dislodged from its working position with reference to the spindle arm and shaft. The spring 17 is so gauged as to strength and shape of its convolutions as to properly dispose the spindle when the device is loaded. I provide at 24 a bumper pad of rubber or other suitable material supported by a saddle 25 to contact with a bumper pad 26 upon the spindle arm 13 in the event that a shock or overload tends to put excess stresses upon the spring 17.

From the above description it will be apparent that my unitary assembly including the frame 10, the spindle shaft 12 and spindle arm 13, together with spring 16, comprises an easily usuable unit to be installed in conjunction with a trailer frame 30 which I have shown in the drawing as a conventional, rectangular frame of wood, but which may be of any size or shape and constructed of any materials to which my angle iron frame 10 may be attached by bolts 31 or other suitable means of attachment.

Under ordinary loading conditions and with the use of ordinary strength trailer frame materials, the unit which I have thus far described would be extremely satisfactory, but under some circumstances where the materials of the trailer frame 30 may be of such a size and shape as to require reinforcement against the torsional stresses induced by the offset relation of the wheels 15 to the longitudinal axis of the side members of the frame 30, I provide at 35 upon the inner face of the angle iron frame 10 a brace pad to receive a strut 36 which may be bolted at 37 to the brace pads 35 and thus resist the torsional stresses upon the side members of the frame 30.

My unitary wheel assembly, when installed in conjunction with any frame 30 of a trailer, is readily attachable to the trailer frame and does not require conventional trailer frame configuration. It is sufficient if there be a short length of trailer frame 30 in the side members thereof to be received in the angle iron frame 10, thus dispensing with axle structure and other cumbersome elements of the usual trailer chassis.

I claim:

In a trailer frame and wheel construction a comparatively light body frame, oppositely positioned individually sprung wheels, spindles for the wheels having a crank-like configuration extending laterally of the trailer frame and having a short, comparatively stiff spindle frame quickly attachable to the body frame to provide a mounting for said spindles, a terminal for the spindle "inside" the body frame, a torsion spring extending from the spring terminal to the spindle frame to receive the weight load upon the body frame, a brace pad comprising a portion of the spindle frame extended inwardly of the trailer frame and a strut extending between the brace pads whereby to resist torsional strains upon the spindle frame by reason of the external disposition of the spindle cranks.

MAX E. DAYTON.